US008839254B2

(12) United States Patent
Horvitz et al.

(10) Patent No.: US 8,839,254 B2
(45) Date of Patent: Sep. 16, 2014

(54) PRECOMPUTATION FOR DATA CENTER LOAD BALANCING

(75) Inventors: Eric J. Horvitz, Kirkland, WA (US); Christian L. Belady, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 12/492,385

(22) Filed: Jun. 26, 2009

(65) Prior Publication Data

US 2010/0333105 A1 Dec. 30, 2010

(51) Int. Cl.
*G06F 9/46* (2006.01)
*G06F 9/48* (2006.01)

(52) U.S. Cl.
CPC ............ *G06F 9/4893* (2013.01); *Y02B 60/144* (2013.01)
USPC .......................................... 718/102; 718/105

(58) Field of Classification Search
USPC ....................................................... 718/100
See application file for complete search history.

(56) References Cited

U.S. PATENT DOCUMENTS

| 5,576,700 | A | 11/1996 | Davis et al. |
| 6,263,315 | B1 | 7/2001 | Talluri |
| 6,452,289 | B1 | 9/2002 | Lansberry |
| 6,795,928 | B2 | 9/2004 | Bradley et al. |
| 7,110,913 | B2 | 9/2006 | Monroe et al. |
| 7,111,061 | B2 | 9/2006 | Leighton et al. |
| 7,127,625 | B2 | 10/2006 | Farkas et al. |
| 7,135,956 | B2 | 11/2006 | Bartone et al. |
| 7,136,830 | B1 | 11/2006 | Kuelbs et al. |
| 7,272,735 | B2 | 9/2007 | Fung |
| 7,318,154 | B2 | 1/2008 | Tehee, Jr. |
| 7,321,221 | B2 | 1/2008 | Bucker et al. |
| 7,350,186 | B2 * | 3/2008 | Coleman et al. ............. 717/103 |

(Continued)

FOREIGN PATENT DOCUMENTS

| JP | 2003162591 | 6/2006 |
| JP | 2007249470 | 9/2007 |

(Continued)

OTHER PUBLICATIONS

"ASG-Workload Optimization Suite for Comprehensive Workload Analysis and Forecasting", retrieved on May 11, 2009 at http://www.asg.com/products/product_details.asp?code=WOS, Allen Systems Group, Inc., 2009, 2 pages.

(Continued)

*Primary Examiner* — Meng An
*Assistant Examiner* — Wissam Rashid
(74) *Attorney, Agent, or Firm* — Dan Choi; Judy Yee; Micky Minhas

(57) ABSTRACT

Pre-computing a portion of forecasted workloads may enable load-balancing of data center workload, which may ultimately reduce capital and operational costs associated with data centers. Computing tasks performed by the data centers may be analyzed to identify computing tasks that are eligible for pre-computing, and may be performed prior to an actual data request from a user or entity. In some aspects, the pre-computing tasks may be performed during a low-volume workload period prior to a high-volume workload period to reduce peaks that typically occur in data center workloads that do not utilize pre-computation. Statistical modeling methods can be used to make predictions about the tasks that can be expected to maximally contribute to bottlenecks at data centers and to guide the speculative computing.

19 Claims, 9 Drawing Sheets

(56) References Cited

U.S. PATENT DOCUMENTS

| | | | |
|---|---|---|---|
| 7,365,973 B2 | 4/2008 | Rasmussen et al. | |
| 7,373,268 B1 | 5/2008 | Viredaz et al. | |
| 7,379,884 B2 | 5/2008 | Barsness | |
| 7,437,730 B2 | 10/2008 | Goyal | |
| 7,484,111 B2 | 1/2009 | Fung | |
| 7,500,001 B2 | 3/2009 | Tameshige et al. | |
| 7,525,207 B2 | 4/2009 | Clidaras | |
| 7,551,130 B2 | 6/2009 | Altenschulte | |
| 7,552,350 B2 | 6/2009 | Fung | |
| 7,560,823 B2 | 7/2009 | Schellings | |
| 7,606,719 B2 | 10/2009 | Barsness | |
| 7,608,937 B1 | 10/2009 | Altenschulte | |
| 7,711,587 B2 * | 5/2010 | De Marcken | 705/5 |
| 7,797,563 B1 | 9/2010 | Moll | |
| 7,820,321 B2 | 10/2010 | Horne | |
| 7,881,057 B2 | 2/2011 | Fink | |
| 7,923,965 B2 | 4/2011 | Ritter | |
| 8,041,967 B2 | 10/2011 | Belady et al. | |
| 8,080,898 B2 | 12/2011 | Fukuhara | |
| 8,080,900 B2 | 12/2011 | Corhodzic | |
| 8,082,454 B2 | 12/2011 | Totten | |
| 8,164,897 B2 | 4/2012 | Graybill | |
| 8,189,561 B2 | 5/2012 | Karaoguz et al. | |
| 8,225,119 B2 | 7/2012 | Jain | |
| 8,458,011 B2 | 6/2013 | Al-Dawsari | |
| 2002/0004913 A1 | 1/2002 | Fung | |
| 2002/0152305 A1 | 10/2002 | Jackson et al. | |
| 2003/0079151 A1 | 4/2003 | Bohrer | |
| 2003/0115495 A1 | 6/2003 | Rawson | |
| 2003/0193777 A1 | 10/2003 | Friedrich et al. | |
| 2003/0196126 A1 | 10/2003 | Fung | |
| 2004/0177057 A1 | 9/2004 | Fairchild et al. | |
| 2005/0132051 A1 | 6/2005 | Hill | |
| 2005/0190912 A1 * | 9/2005 | Hopkins et al. | 380/44 |
| 2005/0193113 A1 | 9/2005 | Kokusho | |
| 2005/0256952 A1 | 11/2005 | Mouhanna et al. | |
| 2006/0036878 A1 | 2/2006 | Rothman | |
| 2006/0041537 A1 | 2/2006 | Ahmed | |
| 2006/0080213 A1 | 4/2006 | Inoue | |
| 2006/0184287 A1 | 8/2006 | Belady et al. | |
| 2006/0277109 A1 | 12/2006 | Kerth et al. | |
| 2007/0049133 A1 | 3/2007 | Conroy | |
| 2007/0130341 A1 | 6/2007 | Ma | |
| 2007/0250838 A1 | 10/2007 | Belady et al. | |
| 2007/0294408 A1 | 12/2007 | Jackson | |
| 2008/0030078 A1 | 2/2008 | Whitted | |
| 2008/0049714 A1 | 2/2008 | Commarford et al. | |
| 2008/0072090 A1 | 3/2008 | O'Connor | |
| 2008/0141048 A1 | 6/2008 | Palmer | |
| 2008/0201720 A1 | 8/2008 | Betzler | |
| 2008/0234873 A1 | 9/2008 | Gorbatov et al. | |
| 2008/0255899 A1 | 10/2008 | McConnell et al. | |
| 2008/0313101 A1 | 12/2008 | Helander et al. | |
| 2009/0063122 A1 | 3/2009 | Nasle | |
| 2009/0106571 A1 | 4/2009 | Low et al. | |
| 2009/0119233 A1 | 5/2009 | Dunagan et al. | |
| 2009/0228726 A1 | 9/2009 | Malik et al. | |
| 2009/0229194 A1 | 9/2009 | Armillas | |
| 2009/0248854 A1 | 10/2009 | Conway | |
| 2009/0251860 A1 | 10/2009 | Belady et al. | |
| 2009/0254660 A1 | 10/2009 | Hanson | |
| 2009/0265568 A1 | 10/2009 | Jackson | |
| 2009/0265704 A1 | 10/2009 | Branda et al. | |
| 2009/0271046 A1 | 10/2009 | Lewis | |
| 2009/0276771 A1 | 11/2009 | Nickolov et al. | |
| 2009/0281846 A1 | 11/2009 | Rose | |
| 2009/0295167 A1 | 12/2009 | Clidaras et al. | |
| 2009/0319090 A1 | 12/2009 | Dillon et al. | |
| 2010/0020806 A1 | 1/2010 | Vahdat et al. | |
| 2010/0037038 A1 | 2/2010 | Bieswanger | |
| 2010/0049616 A1 | 2/2010 | Hipsher | |
| 2010/0050172 A1 | 2/2010 | Ferris | |
| 2010/0057641 A1 | 3/2010 | Boss | |
| 2010/0058350 A1 | 3/2010 | Boss | |
| 2010/0061250 A1 | 3/2010 | Nugent | |
| 2010/0088150 A1 | 4/2010 | Mazhar et al. | |
| 2010/0088205 A1 | 4/2010 | Robertson | |
| 2010/0100696 A1 | 4/2010 | Suzuki | |
| 2010/0145801 A1 | 6/2010 | Chekuri | |
| 2010/0191998 A1 | 7/2010 | Moore | |
| 2010/0218186 A1 | 8/2010 | Wolfe et al. | |
| 2010/0228819 A1 | 9/2010 | Wei | |
| 2010/0235903 A1 | 9/2010 | Carter et al. | |
| 2010/0250358 A1 | 9/2010 | Elkins, II et al. | |
| 2010/0306776 A1 | 12/2010 | Greene | |
| 2010/0318454 A1 | 12/2010 | Warncke et al. | |
| 2010/0319004 A1 | 12/2010 | Hudson et al. | |
| 2010/0333105 A1 | 12/2010 | Horvitz et al. | |
| 2010/0333116 A1 | 12/2010 | Prahlad et al. | |
| 2011/0016214 A1 | 1/2011 | Jackson | |
| 2011/0055034 A1 | 3/2011 | Ferris et al. | |
| 2011/0099095 A1 | 4/2011 | Moore et al. | |
| 2011/0105015 A1 | 5/2011 | Carlson | |
| 2011/0131309 A1 | 6/2011 | Akiyama et al. | |
| 2011/0161526 A1 | 6/2011 | Ravindran | |
| 2011/0205949 A1 | 8/2011 | Maenpaa et al. | |
| 2011/0208606 A1 | 8/2011 | Hadar et al. | |
| 2011/0231552 A1 | 9/2011 | Carter | |
| 2011/0240265 A1 | 10/2011 | Dechene | |
| 2011/0278928 A1 | 11/2011 | Burger et al. | |
| 2011/0282982 A1 | 11/2011 | Jain | |
| 2011/0288898 A1 | 11/2011 | Roe | |
| 2011/0296019 A1 | 12/2011 | Ferris | |
| 2012/0016721 A1 | 1/2012 | Weinman | |
| 2012/0030356 A1 | 2/2012 | Fletcher | |
| 2012/0089726 A1 | 4/2012 | Doddavula | |
| 2012/0095940 A1 | 4/2012 | Borgs et al. | |
| 2012/0109705 A1 | 5/2012 | Belady et al. | |
| 2012/0115433 A1 | 5/2012 | Young | |
| 2012/0130554 A1 | 5/2012 | Jain et al. | |
| 2012/0158447 A1 | 6/2012 | Jain | |
| 2012/0259760 A1 | 10/2012 | Sgouridis et al. | |
| 2012/0330711 A1 | 12/2012 | Jain et al. | |
| 2012/0331113 A1 | 12/2012 | Jain et al. | |

FOREIGN PATENT DOCUMENTS

| | | |
|---|---|---|
| JP | 2007-324956 | 12/2007 |
| KR | 1020090120704 | 11/2009 |
| WO | 2004/049157 | 6/2004 |
| WO | 2004/092971 | 10/2004 |
| WO | WO2009012451 | 1/2009 |
| WO | WO2010010544 | 1/2010 |

OTHER PUBLICATIONS

Li et al., "Load Balancing for Multi-tiered Database Systems through Autonomic Placement of Materialized Views", retrieved on May 8, 2009 at http://ieeexplore.ieee.org/stamp/stamp.jsp?tp=&arnumber=1617470&isnumber=33902, Proceedings of the 22nd International Conference on Data Engineering (ICDE 2006), 12 pages.

"PlateSpin Recon", retrieved on May 11, 2009 at http://www.novell.com/products/recon/consolidation_ratios.html, Novell, Inc 2009, 2 pages.

"Zeus Launches Data Center Load Balancing Solution", retrieved on May 11, 2009 at http://www.continuitycentral.com/news03343.htm, Continuity Central, Jun. 28, 2007, 1 page.

Vazirani, "Approximation Algorithms", Springer, 2001, 396 pages.

Wang, et al., "Markdown money contract for perishable goods with clearance pricing", Eurpean Journal of Operational Research, Aug. 2009, pp. 1113-1122.

"Window Azure Platform", retrieved on Aug. 5, 2010 from <<http:www-ww.azure.com>>, 2 pages.

Zhang, et al. "Cloud computing: state-of-the-art and research challenges", Journal of Internet Services and Application, vol. 1, May 2010, pp. 7-18.

"About Vibes Interactive", Vibes Interactive LLC, retrieved from <<http://vibesinteractive.com/about_us_html>>, 2010 2 pages.

Bansal, et al., "A Primal-Dual Randomized Algorithm for Weighted Paging", Proceedings of the 48th Annual IEEE Symposium on Foundations of Computer Science, Oct. 2007, 11 pages.

(56) References Cited

OTHER PUBLICATIONS

Bansal, et al., "Metrical Task Systems and the k-Server Problem on HSTs", Proceedings of the 37th International Colloquiumon Automata, Languages and Programming, Jul. 2010, 12 pages.

Bansal, et al., "Randomized Competitive Algorithms for Generalized Caching", Proceedings of the 40th Annual ACM Symposium on Theory of Consulting, May 2008, 10 pages.

Bansal, et al., "Towards the Randomized k-Server Conjecture: A Primal-Dual Approach", Proceedings of the 21st Annual ACM-SIAM Syposium on Discrete Algorithms, Jan. 2010, 24 pages.

Bartal, et al., "A polylog(n)-competitive algorithm for metrical task systems", Proceedings of the 29th Annual ACM Symposium on Theory Computing, Jun. 1997, 9 pages.

Battles, et al., "Reducing Data Center Power Consumption Through Efficient Storage", Network Appliance, Inc., NetApp Vision Series, Feb. 2007, 9 pages.

Belady, "In the Data Center, Power and Cooling Costs More Than the IT Equipment it Supports", Electronics Cooling, Feb. 2007, 6 pages.

Bonvin, et al., "Autonomic SLA-driven Provisioning for Cloud Applications", 11th IEEE/ACM International Symposium on Cluster, Cloud and Grid Computing, May 2011, 10 pages.

Borenstein, et al., "Dynamic Pricing, Advanced Metering and Demand Response in Electricity Markets", University of California Energy Institute, Oct. 2002, 102 pages.

Borodin, et al., "An Optimal On-Line Algorithm for Metrical Task System", Journal of the ACM, vol. 39, No. 4, Oct. 1992, pp. 745-763.

Borodin, et al., "Online Computation and Competitive Analysis", Cambridge University Press, New York, NY, 1998, 6 pages.

Brocade, "Leading the Evolution of the Data Center", Brocade Communications Systems, Inc., Sep. 2008, 8 pages.

Buchbinder, et al., "The Design for Competitive Online Algorithms via a Primal-Dual Approach", Foundaions and Trends in Theoretical Computer Science, vol. 3, Nos. 2-3, Feb. 2009, 174 pages.

Buckbinder, et al, "Online Job-Migration for Reducing the Electricity Bill in the Cloud", Lecture Notes in Computer Science Networking 2011, Proceedings of the International IFIP TC 6 Conference on Networking, vol. 6640, Part 1, May 2011, 14 pages.

Butler, "France unveils carbon tax", Nature, Sep. 2009, 4 pages.

Buyya, et al., "Cloudbus Toolkit for Market-Oriented Cloud Computing", Proceedings of the 1st International Conference on Cloud Computing, Oct. 2009, pp. 24-44.

"Carbon Tax Center", retrieved from <.carbontax.org>>on Aug. 8, 2010, 7 pages.

Chase, et al., "Managing Energy and Server Resources in Hosting Centers", Proceedings of the Eighteenth ACM Symposium on Operating Principles, Oct. 2001, 14 pages.

Chatwin, "Optimal dynamic pricing of perishable products with stochastic demand and finite set of prices", European Journal of Operational Research, 125 (2000), available as early as Aug. 1997, pp. 149-174.

Chen, et al., "Energy-Aware Server Provisioning and Load Dispatching for Connectino-Intensive Internet Services", Proceedings of the 5th USENIX Symposium on Networked System Design and Implementation, Apr. 2008, 14 pages.

Cho, et al., "Strategic Consumer Response to Dynamic Pricing of Perishable Products", International Series in Operations Research and Management Science, vol. 131, Aug. 2008, 36 pages.

"Consultants:HOW and WHY Pay Per Performance Works (Part 2—continuation form last post)", Weblog posting, retreived from <://bizrelationships.wordpress.com/2010/04/19/consultants-how-and-why-pay-per-performance-works-part-2-continuation-from-last-post>>, Apr. 2010, 5 pages.

Dasu, et al., "Dynamic pricing when consumers are strategic: Analysis of a posted pricing scheme", European Journal of Operational Research, vol. 204, Issue 3, Aug. 2010, 23 pages.

Dept of Energy EPA, "Carbon Dioxide Emissions from the Generation of Electric Power in the United States", retrieved from <www.eia.gov/cneaf/electricity/page/co2_report/co2report.html, Jul. 2000, 21 pages.

Dunn, "Data Center Energy Efficient Through BCM", Industry Perspectives, Jan. 2010, 7 pages.

EMC2, "Managing Energy Efficiency in the Data Center", EMC Corporation, May 2008, 6 pages.

Fan, et al., "Power Provisioning for a Warehouse-sized Computer", Proceedings of the ACM International Symposium on Computer Architecture, Jun. 2077, 11 pages.

Fiat, et al., "Better Algorithms for Unfair Metrical Task Systems and Applications", Proceedings of the 32nd Annual ACM Symposium on Theory of Computing, May 2000, 20 pages.

Grossman, "The Case for Cloud Computing", IT Professional. Volume 11, No. 2, Mar. 2009, pp. 23-27.

Harrison, "Symantic Energy Efficient Data Center Solutions—An Executive Overview", Symantic Technology Network: Energy Efficient Data Center, Symantic Corporation, Jan. 2008, 15 pages.

Hitachi, et al., "The Path to a Green Data Center", Hitachi Data Systems and Brocade Joint Solution Brief, Mar. 2007, 8 pages.

Jiang, et al., "Enabling Autonomic Power-Aware Management of Instrumented Data Centers", Proceedings of the IEEE International Symposium on Parallel & Distributed Processing, May 2008, 8 pages.

Kahn, "As power demand soars from hot weather, grid holds up so far", Associated Press, Jul. 2010, 1 page.

Levin, et al., "Dynamic Pricing in the Presence of Strategic Consumers and Oligopolistic Competition", Management Science, vol. 55, No. 1, Jan. 2009, pp. 32-46.

Levin, et al., "Optimal Dynamic Pricing of Perishable Items by a Monopolist Facing Strategic Consumers", Production and Operations Management (POMS), vol. 19, Issue 1, Jan./Feb. 2010, 53 pages.

McGeehan, "Heat Wave Report: 102 Degrees in Central Park", The New York Times, Jul. 2010, 17 pages.

Pauley, "Cloud Provider Transparency: An Empirical Evaluation", IEEE Security and Privacy, vol. 8, No. 6, Nov./Dec. 2010, pp. 32-39.

International Search Report dated Jan. 31, 2013 for PCT Patent Application No. PCT/US2012/042110, 9 pages.

Perry, "Australian Greens propose A$23/ton carbon tax", Reuters, Jun. 2010, 2 pages.

Pflueger, et al., "Data Center Efficiency in the Scalable Enterprise", Dell Power Solutions, Feb. 2007, 7 pages.

Popa, et al., "Enabling Security in Cloud Storage SLAs with CloudProof", Microsoft Research Technical Report MSR-TR-2010-46, May 2010, 12 pages.

Qureshi, et al., "Cutting the Electric Bill for Internet-Scale Systems", SIGCOMM'09, Aug. 2009, 12 pages.

Rao, et al."Minimizing Electricity Cost Optimization of Distributed Internet Data Centers in a Multi-Electricity-Market Environment", INFOCOM, Mar. 2010, 9 pages.

Rasmussen, "Implementing Energy Efficient Data Centers", White Paper #114, American Power Conversion (APC), retrieved at <<www.sidepath.com/infrastructure/files/Implementing%20Energy%20Efficient%20Datacenters. pdf>>, 2006, 15 pages.

"Sensible Cloud: What is an SLA?", retrieved from .sensiblecloud.com/2010/11/what-is-sla>>, Nov. 2010, 8 pages.

Sleator, et al., "Amortized Efficiency of List Update and Paging Rules", Communications of the ACM, vol. 28, No. 2, Feb. 1985, pp. 202-208.

Sweeting, "Dynamic Pricing Behavior in Perishable Goods Markets: Evidence from Secondary Markets for Major League Baseball Tickets", Department of Economics, Duke University, Durham, NC, Feb. 2010, 65 pages.

Timmer, "Renewable energy and the future of the datacenter", Arstechinica.com Business News, May 2008, 2 pages.

"Tout+Interactive", retreived from ://toutinteractive.com>>, retrieved on Mar. 22, 2011, earliest weblog entries from Nov. 2010, 8 pages.

"Solar chimney", Wikipedia, Published on or before Feb. 27, 2005.

"Solar updraft tower", Wikipedia, Published on or before Aug. 30, 2006.

(56) References Cited

OTHER PUBLICATIONS

Beloglazov, "Energy Efficient Resource Management in Virtualized Cloud Data Centers", Proceedings of the 10th IEEE/ACM International Conference on Cluster, Cloud and Grid Computing, May 17-20, 2010.
Clark, "Live Migration of Virtual Machines", Proceedings of the 2nd ACM/USENIX Symposium on Networked Systems Design & Implementation, May 2-4, 2005.
Jain, "An Optimization Framework for Dynamic Client-Server Partitioning in the IMA Application", Apr. 16, 2010.
Ardagna, "SLA Based Profit Optimization in Multi-tier Systems", Proceedings of the Fourth IEEE International Symposium on Network Computing and Applications, Jul. 27-29, 2005.
Karve, "Dynamic Placement for Clustered Web Applications", Proceedings of the 15th International World Wide Web Conference, May 22-26, 2006.
Liu, "GreenCloud: A New Architecture for Green Data Center", Proceedings of the 6th International Conference on Autonomic Computing and Communications Industry Session, Jun. 16, 2009.
PCT International Search Report and Written Opinion for Application No. PCT/US2011/036364, Dec. 23, 2011.
Jain, "SLA-Integrated Pricing Models for Cloud Computing", Microsoft Research, Oct. 18, 2010.
Borgs, "Optimal Mechanisms for Perishable Goods With Variable Supply and Demand", Aug. 11, 2010.
PCT International Search Report and Written Opinion for Application No. PCT/US2012/042110, Jan. 31, 2013.
Chaver, "Energy-Aware Fetch Mechanism: Trace Cache and BTB Customization", Proceedings of the 2005 International Symposium on Low Power Electronics and Design, Aug. 8-10, 2005.
Giannakoudis, "Optimum design and operation under uncertainty of power systems using renewable energy sources and hydrogen storage", International Journal of Hydrogen Energy, ScienceDirect, Available online Nov. 27, 2009.
Gmach, "Capacity Planning and Power Management to Exploit Sustainable Energy", Proceedings of the 6th International Conference on Network and Service Management, Oct. 25-29, 2010.
Kant, "Power Control of High Speed Network Interconnects in Data Centers", Proceedings of the 28th IEEE International Conference on Computer Communications, Apr. 19-25, 2009.
Kant, "Data center evolution: A tutorial on state of the art, issues, and challenges", Computer Networks, Nov. 12, 2009.
Kant, "Distributed Energy Adaptive Computing", IEEE International Conference on Communications, May 23-27, 2010.
Verma, "Brownmap: Enforcing Power Budget in Shared Data Centers", IBM Research Report, Dec. 17, 2009.
U.S. Appl. No. 12/391,188, filed Feb. 23, 2009, Navendu Jain.
U.S. Appl. No. 12/781,445, filed May 17, 2010, Douglas C. Burger.
U.S. Appl. No. 17/779,059, filed May 13, 2010, Navendu Jain.
U.S. Appl. No. 12/913,763, filed Oct. 28, 2010, Christian L. Belady.
U.S. Appl. No. 12/951,977, filed Nov. 22, 2010, Navendu Jain.
U.S. Appl. No. 12/973,399, filed Dec. 20, 2010, Navendu Jain.
U.S. Appl. No. 12/903,227, filed Oct. 13, 2010, Christian H. Borgs.
U.S. Appl. No. 13/169,923, filed Jun. 27, 2011, Navendu Jain.
U.S. Appl. No. 13/169,890, filed Jun. 27, 2011, Navendu Jain.
Felter, "A Performance-Conserving Approach for Reducing Peak Power Consumption in Server Systems", Proceedings of the 19th Annual International Conference on Supercomputing, Jun. 20-22, 2005.
Wang, "Feedback Control Algorithms for Power Management of Servers"; Third International Workshop on Feedback Control Implementation and Design in Computing Systems and Networks, Jun. 6, 2008.
PCT International Search Report and Written Opinion for Application No. PCT/US2010/023253, Sep. 30, 2010.
Iranli, "System-Level Power Management: An Overview", In The VLSI Handbook Second Edition, CRC Press, Dec. 26, 2006.
Bianchini, "Power and Energy Management for Server Systems", IEEE Computer, vol. 37, No. 11, Nov. 2004.
Urgaonkar, "Dynamic Provisioning of Multi-tier Internet Applications", In Proceedings of the Second International Conference on Autonomic Computing, Jun. 13-16, 2005.
CN Notice on the First Office Action for Application No. 201080009556.7, Jul. 29, 2013.
EP Communication for Application No. 10744134.7-2211/2399183 PCT/US2010023253, Nov. 14, 2012.
JP Notice of Rejection for Application No. 2011-551110, Jul. 2, 2013.
CN Notice on the Second Office Action for Application No. 201080009556.7, Dated Feb. 21, 2014.
CN Response to Second Office Action for Application No. 201080009556.7, Filed May 7, 2014.
EP Response to Rules 70(2) and 70a(2) EPC Communication for Application No. 10744134.7, Filed Jan. 30, 2013.
JP Second Office Action for Application No. 2011-551110, Dated Mar. 11, 2014.

\* cited by examiner

PRECOMPUTATION FOR DATA CENTER LOAD BALANCING

BACKGROUND

Data centers often include hundreds to thousands of servers that are configured to process large volumes of data. These data centers may deliver email messages, perform search queries, process retail and bank transactions, stream video and other media, and perform other computation-intensive and high demand computing tasks. Often, a volume of processing at data centers varies greatly over time, which creates periods where the data centers operate near a peak output and other periods where the data centers are underutilized and operate well below the peak output. For example, data centers may experience a lower volume demand late at night or very early in the morning when fewer users are interacting with the data centers.

Data centers are very expensive to build costing upwards of hundreds of millions of dollars, where the expense relates to a capacity of the data centers. Some data centers are designed with extra capacity that can accommodate a very high computing volume that is experienced during a peak time. However, often the data center operates below capacity and the extra capacity may be unused (idle). In addition, this approach of designing to maximum capacity may be very costly because peaks may be much larger than an average computing workload, and thus a large portion of the investment to create a data center may only be used reach the peak capacity that is infrequent. This may result in millions of dollars in stranded capacity that could have been better allocated to provide an overall lower computational cost.

A second approach is to design a data center to perform at or near a mean workload level and delay or otherwise underperform during peak processing times. However, this approach may lead to large data latency, stale data, disappointed users, and other disadvantageous consequences. For example, throttling of CPU's may be employed to limit power consumption but also limits throughput, which may have disadvantageous results.

Operating costs for data centers are also very expensive. An improvement in efficiency of the data centers may enable a substantial reduction in operational costs as compared to computing workload. For example, by making a data center twice as efficient, it may perform operations that previously required two data centers, and thus the improved data center may have a much lower operation cost than an operation cost of two lower efficiency data centers that have a comparable computing capacity.

SUMMARY

Server workload may be smoothed to reduce or eliminate peaks in workload by pre-computing in a speculative manner one or more aspect of all or a portion of tasks that are predicted to occur during a high-volume period. Pre-computation may reduce capital and operational costs associated with data centers. Computing tasks performed by the data centers may be analyzed to identify computing tasks that are eligible for pre-computing, and may be performed prior to an actual data request from a user or entity.

In some aspects, the pre-computing tasks may be performed during a low-volume workload period prior to a high-volume workload period to reduce peaks that typically occur in data center workloads that do not utilize pre-computation. The pre-computing tasks may also be performed when operational factors of the servers or data center are optimal, such as when energy prices are least expensive.

In further aspects, the pre-computed data containing results and or partial solutions may be stored in memory. Upon a receipt of a request for data that has been pre-computed (at least in part), the pre-computed data or partial result may be retrieved from memory. Further processing may be performed on the manipulated data or partial solutions. Finally, the manipulated data may be transmitted to the end user or entity to satisfy the request using less power and to generate a faster response.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2A shows illustrative data center workload versus time, FIG. 2B shows illustrative cost per unit of inputs for the data center, and FIG. 2C shows an illustrative overlay of the data from FIGS. 2A-2B.

DETAILED DESCRIPTION

Overview

Pre-computing a portion of forecasted workloads may enable load-balancing of data center workload, which may ultimately reduce capital and operational costs associated with data centers. For example, handling the bottlenecks in processing caused by intermittent spikes in computing needs can lead to significant increases in data center capacity—capacity that is rarely used. Computing tasks performed by the data centers may be analyzed to identify computing tasks that are both eligible for pre-computing—and thus may be performed speculatively prior to an actual data request from a user or entity—and that contribute to spikes.

As an example, a typical data center computation is performed in response to a user request and may include various computation tasks, such as tasks 1 to n: searching a database, compiling data, rendering a result, transmitting data to the user, and so forth. A portion of these example tasks may be performed prior to receipt of the user request by speculatively performing (pre-computing) computations that are likely to be requested by the users or entities (e.g., consumers, researchers, banks, retailers, etc.).

In some embodiments, the pre-computing may be performed when the data center is experiencing a low-volume workload prior to the high-volume workload that would likely include an anticipated user request. In various embodiments, the speculative workload may be allocated to periods of time that include lower operational cost associated with the computations. In addition, the speculative workload may be allocated using a combination of low-volume and low operational cost considerations.

The processes and systems described herein may be implemented in a number of ways. Example implementations are provided below with reference to the following figures.

Illustrative Environment

Figure 1:
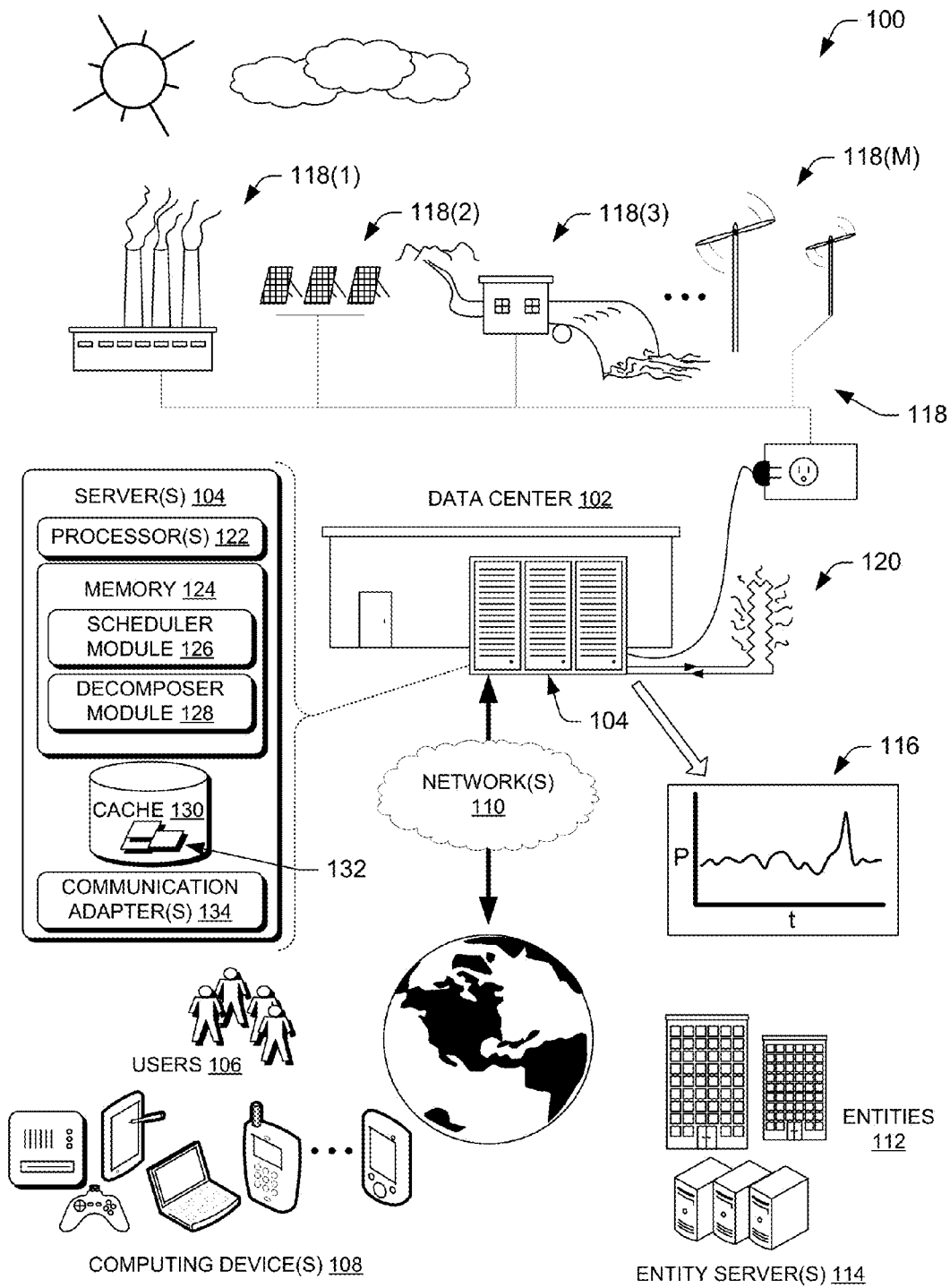
FIG. 1 is a schematic diagram of an illustrative environment, in which embodiments of forecasted pre-computation and load-balancing may be implemented, that includes a data center of servers that process data and exchange data with users and entities.

FIG. 1 is a schematic diagram of an illustrative environment 100 for forecasted pre-computing and load-balancing that includes a data center 102 that processes and exchanges data with other computing devices. The data center 102 may include servers 104 that are capable of performing many different types of computations such as delivering email, streaming data, querying search results, compiling data, processing transactions, and so forth.

The servers 104 at the data center 102 may perform computations for users 106 that may interact with the data center servers using computing devices 108 (or simply "clients") via one or more networks 110. A non-exhaustive list of possible clients 108 may include a personal digital assistant, a personal computer, a mobile telephone, a gaming console, an electronic book, and a music player. For example, the users 106 may request search results from the servers 104 at data center 102, which may, upon receipt of the requests, process computational tasks and transmit a response of search results to the users. In another example, the users 106 may request goods and services by submitting transaction requests to the data center, which, in turn, may process the transactions by performing various computational tasks to carry out the transactions.

In addition, the servers 104 at data center 102 may perform computations for entities 112 having entity servers 114 in communication with the data center via the networks 110. For example, the servers 104 at the data center 102 may process transactions (e.g., financial, inventory, etc.) for the entities, maintain databases (storage, backup, etc.) and perform other computing activities for any one of the entities 112.

An illustrative processing chart 116 may represent a workload of the servers 104 at the data center 102 as they process computations for the users 106 and/or the entities 112. The chart plots a workload with respect to time to show peaks and troughs in workload of the servers 104 over time. By implementing pre-computing, as disclosed herein, the data center 102 may operate with minimal fluctuations in workload such that the deviation between peak and a median workload is minimal.

The data center 102 is in connection to power sources 118. The power sources 118 may include a variety of sources such as a power plant 118(1), solar panels 118(2), a hydroelectric power plant 118(3), and wind turbines 118(m), among other possible power sources. Each power source may be directly connected to the data center (e.g., dedicated supplies) or in connection with the data center via a shared power grid supply where electricity is purchased for consumption by the data center 102. The availability and/or price of each source 118(1)-(m) may vary by factors such as availability of sunlight, wind, water, or other resources, or other factors such as time of day, current demand, etc.

The data center 102 may also include operational factors. For example, in some embodiments, the data center 102 may include a cooling station 120, which may cool the servers 104 by dissipating heat (e.g., via exposure to water, air, or other elements of a lower temperature, etc.) to enable the servers 104 to operate within predefined operational temperature thresholds. In accordance with embodiments, pre-computing may enable workload to be processed by the servers 104 during optimal operation periods such as when energy is less expensive, cooling costs are minimized, and so forth.

As illustrated, the data center 102 is equipped with the servers 104 that include a computing infrastructure to perform forecasted pre-computation for load-balancing of data center workload. The servers 104 may include one or more processors 122 and memory 124 that is accessible by the processors. The memory 124 may include applications, modules, and/or data. In some embodiments, the memory 124 may include a scheduler module 126 and a decomposer module 128.

In some embodiments, the scheduler module 126 may forecast computing workloads of the servers 104 at the data center 102 to create a forecast of the chart 116. In this way, the scheduler module 126 may identify high-volume peaks prior to an occurrence of the peaks. Similarly, the forecast may indicate any low-volume troughs prior to the peaks, which may be advantageous for performing extra computing tasks such as pre-computation to load-balance workload of the servers 104 at the data center 102.

In various embodiments, the decomposer module 128 may identify computing tasks from an expected high-volume peak, which may be pre-computed prior to the peak. The decomposer module 128 may leverage historical trends to optimize database access, process anticipatory queries, perform various steps of transactions, or perform other tasks prior to an initiation of a request from the users 106 and/or the entities 112 of the computations. The decomposer module 128 may store manipulated data 132 that results from the pre-computations in cache 130. The servers 104 may access the manipulated data 132 to expedite computations in response to a request from the users 106 and/or the entities 112, while reducing user-perceived latency as a byproduct of the pre-computation.

The servers 104 may also include one or more communication adapters 134 to enable communication with the clients 108 and/or the entity server(s) 114, via the network(s) 110.

Illustrative Scheduling

Figure 2A:
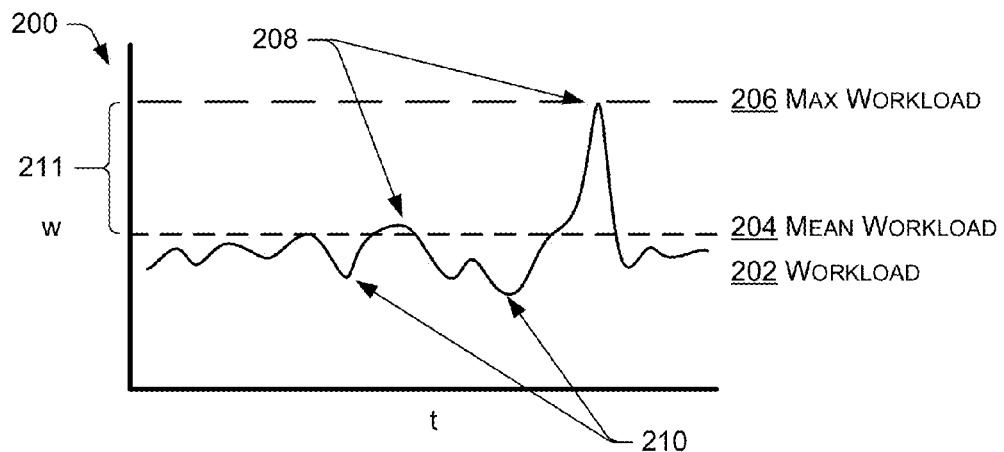
FIGS. 2A, 2B, and 2C are charts that depict illustrative data center metrics.
Figure 2B:
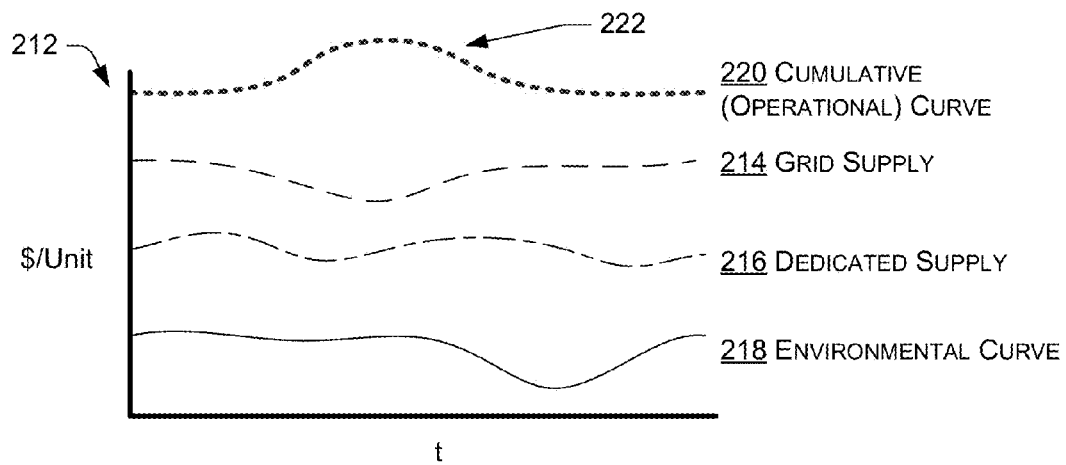
Figure 2C:
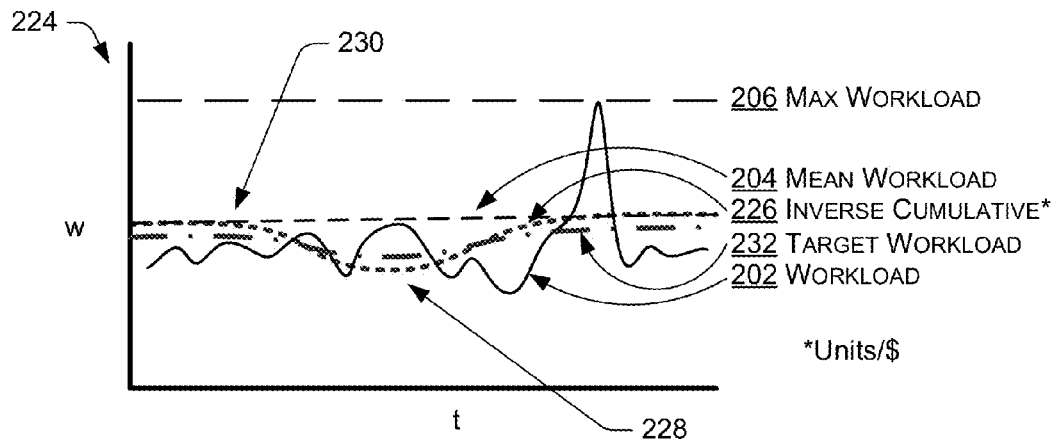

FIGS. 2A, 2B, and 2C are charts that depict illustrative data center operational metrics. The FIGS. 2A-C reference some of the elements discussed previously in FIG. 1. FIG. 2A shows an illustrative chart 200 that depicts data center workload versus time. The chart 200 shows a data center workload 202 plotted over time (t). The magnitude of the workload (w) varies over time. In some embodiments, the scheduler module 126 may forecast the workload 202 to implement pre-computation. The chart 200 also includes a mean workload 204 and a maximum workload indicator 206, which are reference points plotted on the chart 200 relative to the workload 202.

As shown in the illustrative chart 200, the workload 202 includes high-volume (peaks) portions 208 and low-volume (troughs) portions 210. The high-volume portions 208 may occur at random times (e.g., following an accident) or at reoccurring times, such as just before 4 pm Eastern Time (ET) when the stock mark is about to close and many investors query current stock prices. The low-volume portions 210 may often occur when most people are sleeping, e.g., during holidays, etc. In another scenario, workload of the data centers 102 would be smooth (constant) and thus follow the mean workload 204. To accomplish this, computing that occurs at the high-volume portions 208 would be redistributed to the low-volume portions 210 to balance the load of the servers 104 of the data center 102.

A margin 211 shows a difference between the mean workload 204 and the maximum workload indicator 206. The margin 211 represents a stranded cost of overhead (computing power from extra servers, etc.) that is often idle and is primarily used to meet expected peak workloads. Thus, a reallocation of the margin 211 by balancing workload via speculation, as disclosed herein, may enable more effective use (or elimination) of this extra overhead, thus reducing a cost of processing workloads.

FIG. 2B shows an illustrative chart 212 that depicts cost per unit of inputs for the data center 102 versus time. The chart 212 includes a grid supply curve 214 that depicts variations in the price of energy per unit of inputs. The grid supply curve 214 may include costs for electricity from some or all of the power sources 118 of FIG. 1. A dedicated supply curve 216 may include energy costs/unit for dedicated power sources that may be exclusively used by the data center 102, such as the wind turbines 118(m) of a wind harvesting farm and the solar panels 118(2) of a solar harvesting farm. As shown in the chart 212, the dedicated supply curve 216 may include portions for which the cost/unit is low due to factors such as ample sunlight, wind, etc.

In some embodiments, an environment curve 218 may depict costs associated with operating the data center 102 that are not directly related to energy supplies. For example, cooling the servers 104 may be more effectively performed when ambient air temperature outside the data center 102 is relatively cool (e.g., less than the maximum operating temperature of the servers 104, etc.), which may enable operation of the data center at a reduced cost of cooling the servers.

In accordance with various embodiments, the chart 212 may include a cumulative (operational) curve 220 that combines one or more of the various curves 214, 216, and 218 to create a relationship of price per unit associated with operation of the data center 102. As shown in the illustrative chart, the cumulative curve 220 may include a high portion 222 for which operation of the data center 102 may be most expensive based on the factors included in the cumulative curve 220.

FIG. 2C shows an illustrative overlay chart 224 including an overlay of the workload 202 of the chart 200 of FIG. 2A and an inverse curve 226 of the cumulative curve 220 of the chart 212 of FIG. 2B. The inverse curve 226 may indicate an optimal scheduling for balancing the workload of the data center 102 that may result from load-balancing the workload 202. The inverse curve 226 may include a low portion 228 that corresponds to the high portion 222 of the cumulative curve for which the price per unit of operation of the data center 102 is high, thus indicating a less desirable time period for scheduling workloads. The inverse curve 226 may have a high portion 230 that is equivalent to the mean workload 204 due to computing resource limitations, which enable minimization of capital investments of the servers 104 and other capital. This may enable the data center 102 to operate at a highly efficient state with minimal idle resources. Stated another way, the inverse cumulative curve 226 may provide a balance between a high utilization of resources (i.e., the servers 104) while leveraging work during ideal time periods to leverage operations cost savings. A target workload 232 may be derived from aspects of the mean workload 204 and/or the inverse cumulative curve 226, to create a target (goal) workload of the data center 102 after load balancing by pre-computing workload. In the next section, pre-computing concepts are introduced to explain how to shift the workload 202 to match the target workload 232 to achieve these aforementioned goals.

Illustrative Pre-Computation

Figure 3:
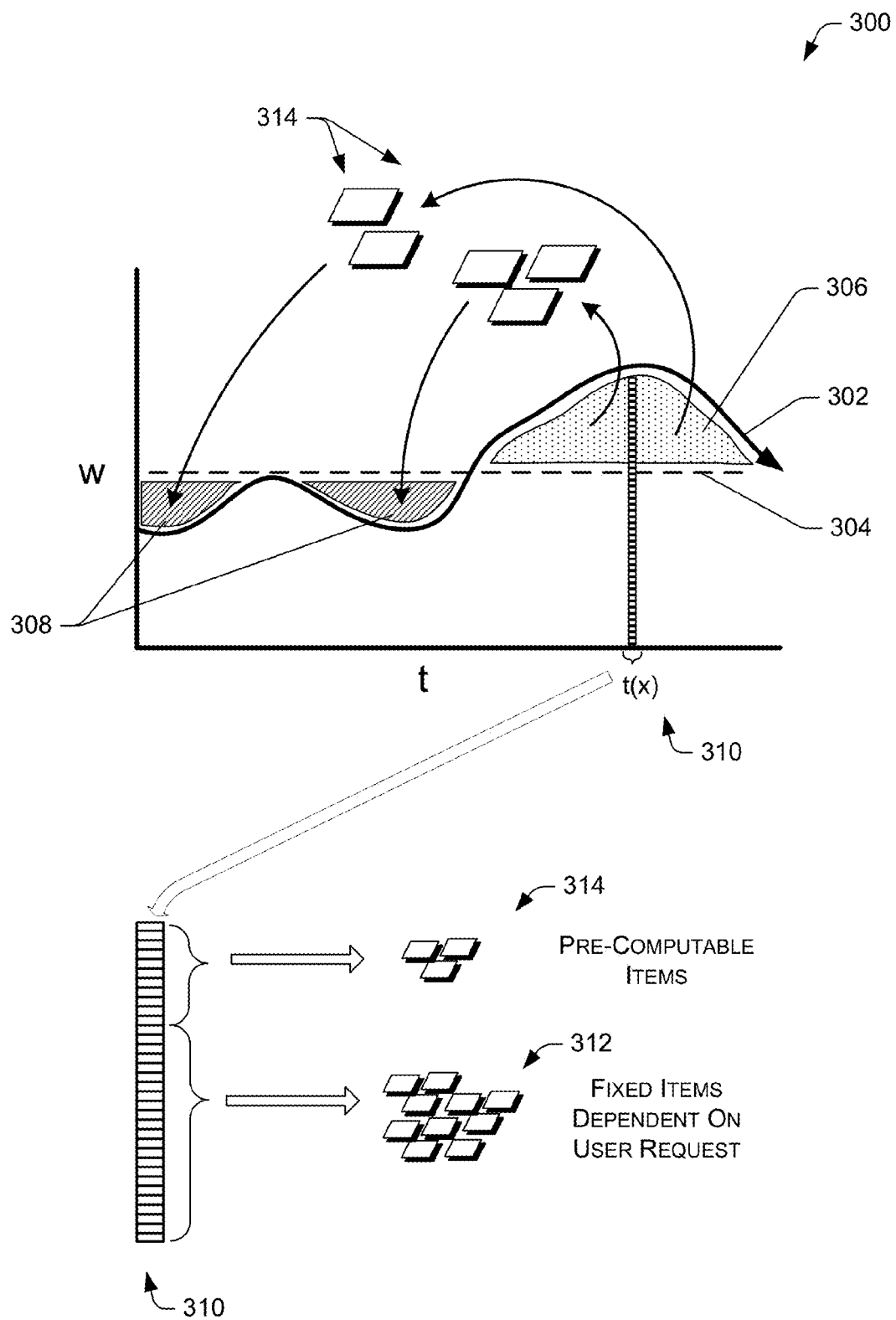
FIG. 3 is a chart that depicts illustrative load-balancing of computing tasks from a high-volume period to a prior low-volume period of operation of a data center.

FIG. 3 is a chart 300 that depicts illustrative load-balancing of computing tasks from a high-volume period to a prior low-volume period of operation of the data center 102 of FIG. 1. The chart 300 includes a workload 302 that depicts illustrative computing workload over time and a mean workload 304. In some embodiments, the workload 302 may be a forecasted workload that is generated by the scheduler module 126. The workload 302 includes a high-volume portion 306 and low-volume portions 308 that occur prior to the high-volume portion.

In accordance with various embodiments, the workload 302 includes millions of computing tasks performed for each time slice 310 at (e.g., at t(x)) by the servers 104 at the data center 102. The time slice 310 may include fixed tasks 312 which are dependent on user requests, and thus cannot be processed in advance of the user requests. For example, the fixed tasks 312 may include computing requests that deliver a time-sensitive output to the user because the output cannot be adequately performed in advance of a user request.

In various embodiments, the time slice 310 may also include pre-computable tasks which may be performed in advance of the user requests. For example, pre-computable tasks 314 may include repetitive tasks identified by the decomposer module 128 such as simple searches of high hit-rate subject matter (e.g., celebrity searches, news items, etc.) or queries that may be pre-computed in advance of an arbitrarily scheduled time, and so forth. For example, a feed in a texting feed or other source of evidence that there will be a breaking, popular news story can lead to the proactive generation of news summary pages and search results pages linked to forthcoming expected queries, so as to minimize the expected spikes that will be occurring when awareness and interest grows. Sources of early warning and guidance on future interests by large populations, as well as patterns of evidence that predict the nature and distribution of future interest can be learned with statistical machine learning methods from case libraries over time and then used in similar situations to predict future load and to guide speculative computing aimed at using computation in advance of forthcoming loads to maximally reduce the future real time load on a data center. In the case of a pre-computed and potentially pre-rendered search results, the query search result may be stored in the cache 130 as the manipulated data 132 until a user is identified and the data center 102 can complete the computing by transmitting the manipulated data 132 to a requesting user.

Such pre-computed results may not be as high of quality as results computed in real time. However, they can be formulated in a manner that makes them partial results, enabling them to be extended and refreshed in real time with lesser amounts of computation than would be required to completely compute and render the search results or other results from scratch in real time.

Furthermore, such pre-computed results may be used as sufficient fallbacks to reduce real time spikes to be supplanted by freshly computed updates when the computation becomes available given the resources of a data center and target latency tolerances for responsiveness to users.

The pre-computable tasks 314, once identified by the decomposer module 128, may be further identified in a forecast of the high-volume portion 306 and then pre-computed in one of the low-volume portions 308 prior to the occurrence of the high-volume portion 306, thus load-balancing the workload of the servers 104 at the data center 102. In accordance with various embodiments, the decomposer module 128 may predict and/or identify types of computing tasks of the servers 104 at the data center 102 that are likely to occur during the high-volume portion 306 (high utilization) and then categorize the computing tasks as the fixed tasks 312 or the pre-computing tasks 314. In various embodiments, the tasks that occur during the high-volume portion 306 may include a percentage of the pre-computable tasks, that when pre-computed, reduce the anticipated (forecasted) high-volume period to a mean-volume period that has a workload that is equal to or less than the mean curve 304, or less than the inverse cumulative curve 226 upon consideration of operational factors of the data center.

Figure 4:
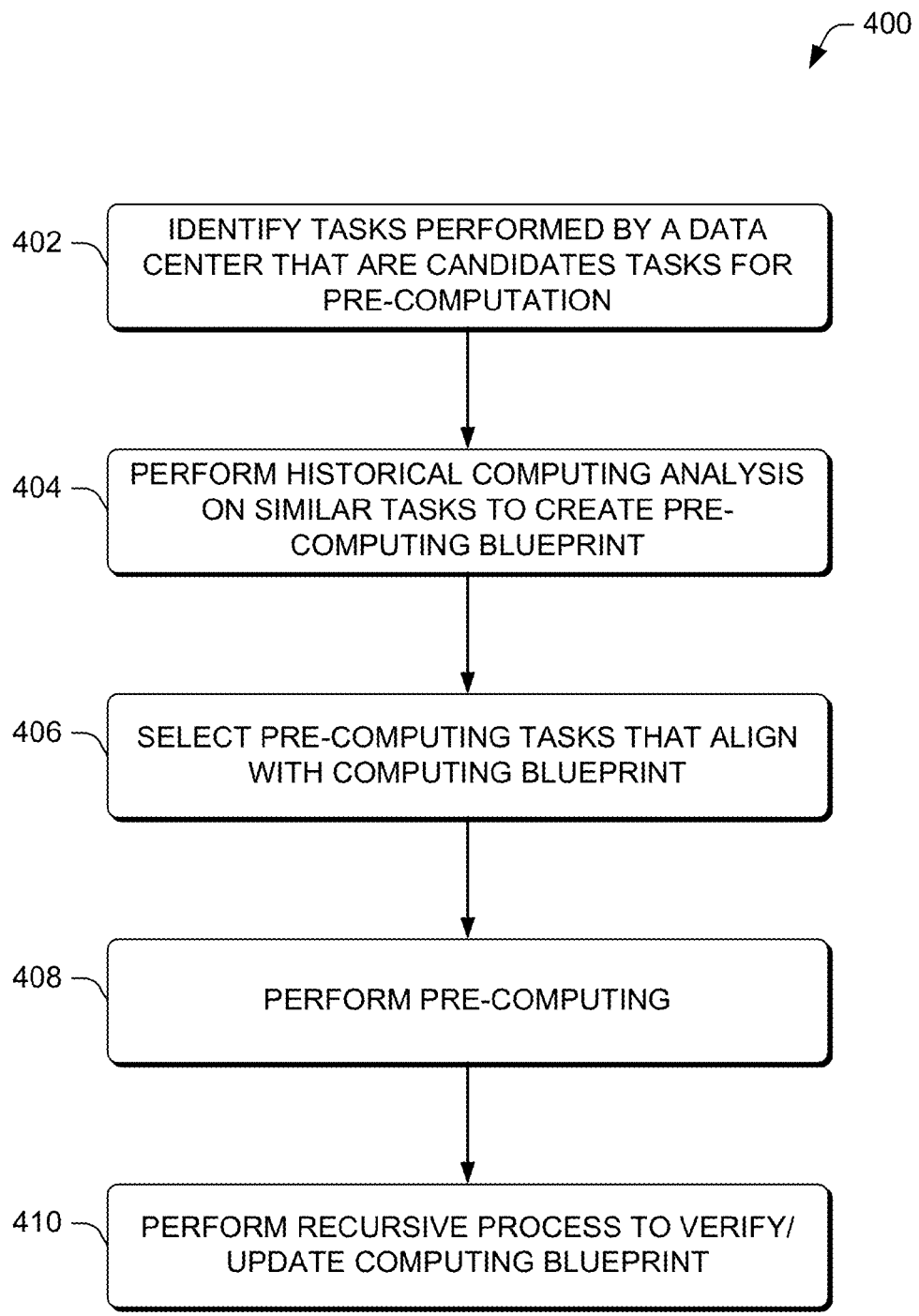
FIG. 4 is a flow diagram of an illustrative process to decompose a predicted high-volume workload of a data center to pre-calculate a portion of the workload.

FIG. 4 is a flow diagram of an illustrative process 400 to decompose a predicted high-volume workload of the data center 102 to pre-calculate a portion of the workload. The process 400 is described with reference to FIG. 1, and the decomposer module 128 may provide instructions for some or all of the operations described in the process 400.

The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly.

At 402, the decomposer module 128 may identify tasks that are performed by the data center 102 that are candidates for pre-computation. In some embodiments, high-volume tasks may be strong candidates for pre-computing because of their repetition, ability to be predicted, and cost savings that may result from pre-computation. For example, popular search queries may be identified as high-volume tasks, such as search queries on recent news topics, celebrities, and so forth. In addition, some transactional processes may also be identified as high-volume tasks, such as verifying payments, rendering pages, and so forth.

At 404, the decomposer module 128 may perform a historical computing analysis on tasks that are similar to the high-volume tasks (or other tasks identified at the operation 402) to create a pre-computing blueprint. The blueprint may indicate trends, patterns, repetitive actions, instructions, or other indicators from computing history that help identify tasks for pre-computing which may ultimately help load-balance the workload 202 of the servers 104 at data center 102. For example, the decomposer module 128 may identify historical trends that indicate a percentage of user searches are predictable and may be pre-computed and stored in cache prior to a user request of the search. In addition, standard search terms may be used in a pre-computing process, and then distributed to users who request similar searches using keywords that overlap with the search terms used in the pre-computing. In another example, transactional orders may be pre-computed based on best selling lists, referrals, or other historical relationships that may predict what orders are likely to occur during a high-volume period of workload 202 of the servers 104 at data center 102.

At 406, the decomposer module 128 may select pre-computing tasks that align with the computing blueprint. The pre-computing tasks may be tagged for pre-computing during an available period, particularly when the servers 104 experience a low-volume workload.

At 408, the pre-computing may be performed, and the manipulated data 132 may be stored in the cache 130 for use at a later time (i.e., during the expected high-volume period).

Finally, at 410, the decomposer module 128 may perform recursive processes to verify and/or update the computing blueprint from the operation 404 based on actual user computing as compared to the forecasted workload 302 (or workload 202) at 408. For example, when pre-computing occurs, the manipulated data 132 may be stored in the cache 130. Some of the manipulated data 132 may not be used because users might not request this data at a later point in time. Thus, some data may become stale (obsolete), or otherwise not be useful. This data may be disregarded after a predetermined passage of time (expiration). The recursive processes may identify the manipulated data 132 that is used and the manipulated data that is not used to make future decisions on what tasks to pre-compute, thus avoiding pre-computation of tasks that creates unused instances of the manipulated data.

In accordance with some embodiments, the process 400 may conduct speculative computing (pre-computation) based on statistical models that are generated from analysis of a combination of user history, machine activity, and data center performance/responsiveness that forecast future needs and future bottlenecks. In addition, the predictions can be optimally coupled with simulators that identify the data that is an ideal candidate for pre-computation to minimize potential bottlenecks in real time or near-real time. Thus, the process 400 may seek predictions about the tasks that can be expected to maximally contribute to bottlenecks at data centers and used to guide the speculative computing.

Illustrative Operation

Figure 5:
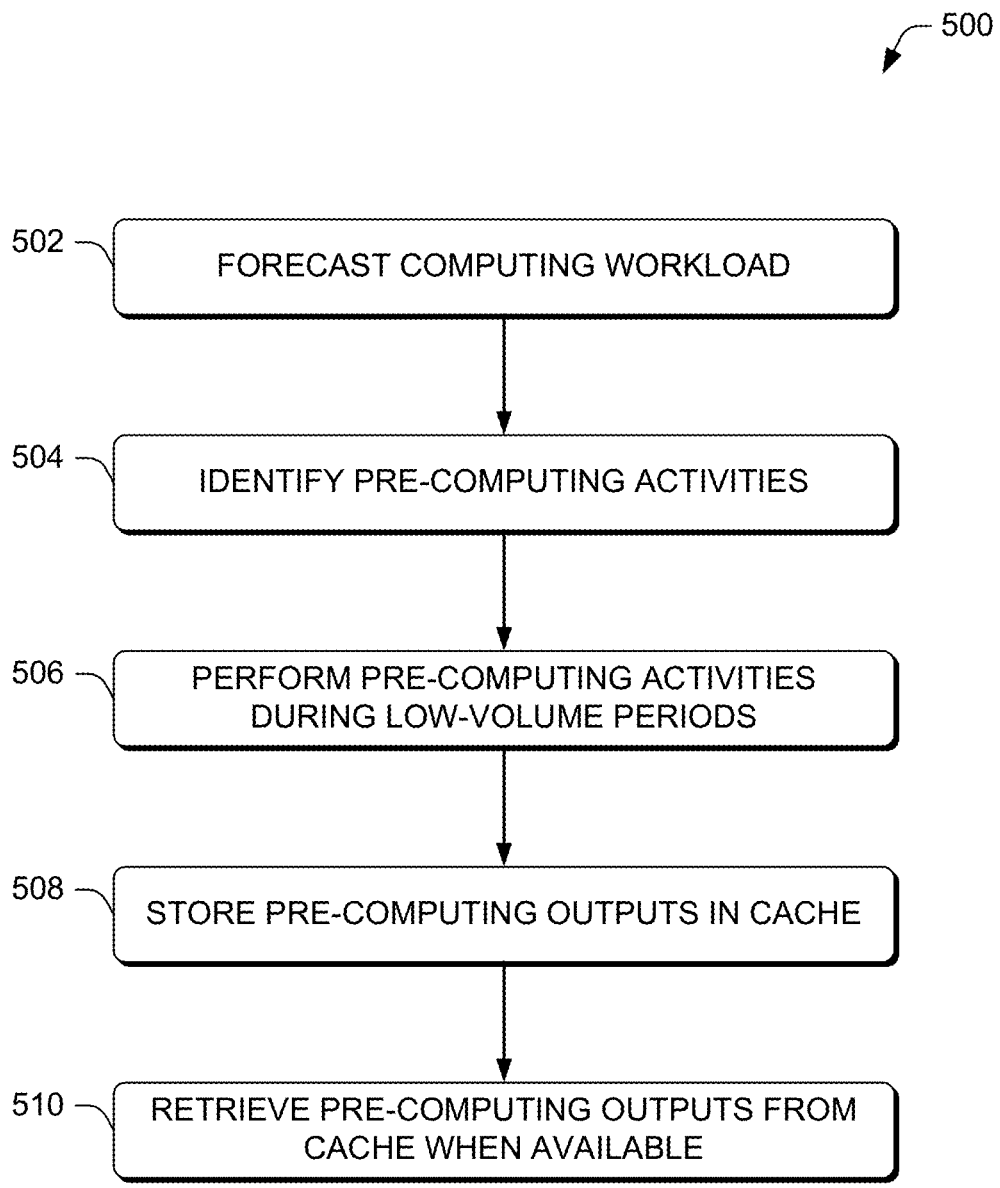
FIG. 5 is a flow diagram of an illustrative process to forecast a computing workload and then balance the workload to reduce peak volume processing.

FIG. 5 is a flow diagram of an illustrative process 500 to forecast a computing workload and then balance the workload to reduce peak volume processing. The process 500 is described with reference to FIGS. 1 and 2. The scheduler module 126 and the decomposer module 128 may provide instructions for some or all of the operations described in the process 500.

At 502, the scheduler module may forecast a computing workload (i.e., schedule) for the servers 104 of the data center 102. The forecasted computing workload may be a workload over a given period of time, on a scale of seconds, minutes, hours, or even days. The forecasted workload may include expected high-volume portions, which may be based on historical trends (e.g., close of stock market, early Monday morning business processing, etc.). In some embodiments, the forecasted workload may be performed at near-real time. In near-real time, the scheduler module 126 may detect an upward trend in workload and determine a peak is likely to occur, which may then prompt pre-computing as discussed below.

At 504, the decomposer module 128 may determine pre-computing activities that may be performed in advance of a user request for data. In some instances, the decomposer module 128 may determine a new computing task has become repetitively requested, such as a query of an event that recently appeared in the news.

At 506, the decomposer module 128 may perform the pre-computing activities during low-volume portions 210. The low-volume portions 210 may be just prior to the high-volume portions (millisecond to seconds before) or may be performed further in advance of the high-volume portions (minutes, hours, or even days before).

At 508, the decomposer module 128 may then store pre-computing results as the manipulated data 132 in the cache 130.

At 510, the decomposer module 128 may retrieve the pre-computing tasks (the manipulated data 132) from the cache 130 for transmission to users/entities in response to a request. The manipulated data 132 may be further processed after a user request to finalize the request or transmitted directly to a user to fulfill a request. For example, a search query result may that is pre-computed may be transmitted to users that submit similar queries in the future, thus effectively pre-computing workload to reduce future loads (load balance) on the servers 104. In another example, a portion of a transaction may be pre-computed prior to a user request. When the servers 104 receive the user request of the transaction, any necessary final steps may occur to the manipulated data 132 stored in the cache 130 to finalize the transaction (e.g., authorizing payment on an e-commerce sale, updating inventory, etc.).

Figure 6:
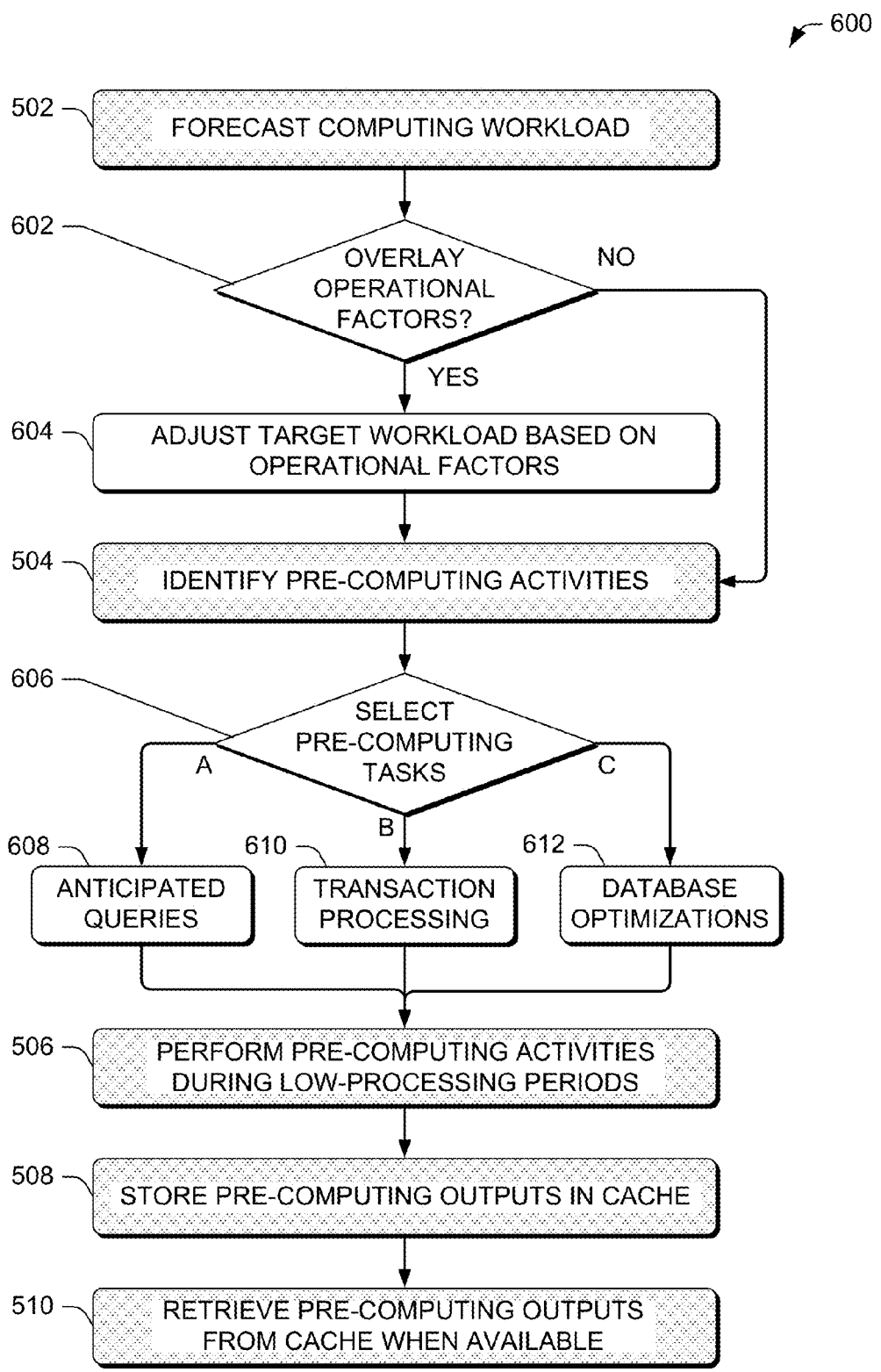
FIG. 6 is a flow diagram of another illustrative process to forecast a computing workload and then balance the workload to reduce peak volume processing.

FIG. 6 is a flow diagram of another illustrative process 600 to forecast a computing workload and then balance the workload to reduce peak volume processing. As indicated in FIG. 6, some of the operations are the same or similar to operations performed in the process 500 and will not be discussed in further detail.

At 602, the scheduler module 126 may determine whether to overlay operational factors in the forecast of the workload. The operational factors may include the grid supply curve 214, the independent supply curve 216, the environmental curve 218 and so forth, which may be implemented as the cumulative (operational) curve 220 (or the inverse cumulative curve 226) which are shown in FIGS. 2B-2C.

At 604, the scheduler module 126 may adjust the target workload 232 (resulting from load-balancing by pre-computations) based on the operational factors. The target workload 232 may be influenced by the inverse cumulative curve 226. In accordance with various embodiments, workload may be pre-computed prior to a high-volume period and when the operational factors (i.e., the cumulative curve) indicate that the operation expense of the data center is relatively lower than a mean operational expense.

At 606, the decomposer module 128 may select one or more pre-computing tasks.

At 608 (via route "A"), anticipated queries may be pre-computed. The anticipated queries may be queries that the decomposer module 128 determines are likely to be requested during the high-volume periods, which may be pre-computed and stored in the cache 130 as the manipulated data 132. For example, search queries on news items or other headlines may be pre-computed queries.

At 610 (via route "B"), the decomposer module 128 may pre-compute transactions. Some transactions may be identified, via negotiations or other indicators, as capable of being pre-computed. Other transactions, such as retail orders, bank processing, etc., may be speculatively pre-computed, at least in part. In this way, the manipulated data 132 that results from the pre-computation may be used to finalize the transactions or may be discarded if it is not needed.

At 612 (via route "C"), the decomposer module 128 may optimize databases during low-volume periods to enhance the performance of database operations (queries, etc.) during the high-volume periods. In this way, the reduction in performance may reduce the peaks experienced by the servers 104 at the data center 102 during the high-volume periods.

The operations 608, 610, and 612 are discussed in greater detail below with reference to FIGS. 7, 8, and 9, respectively.

Additional Embodiments

Figure 7:
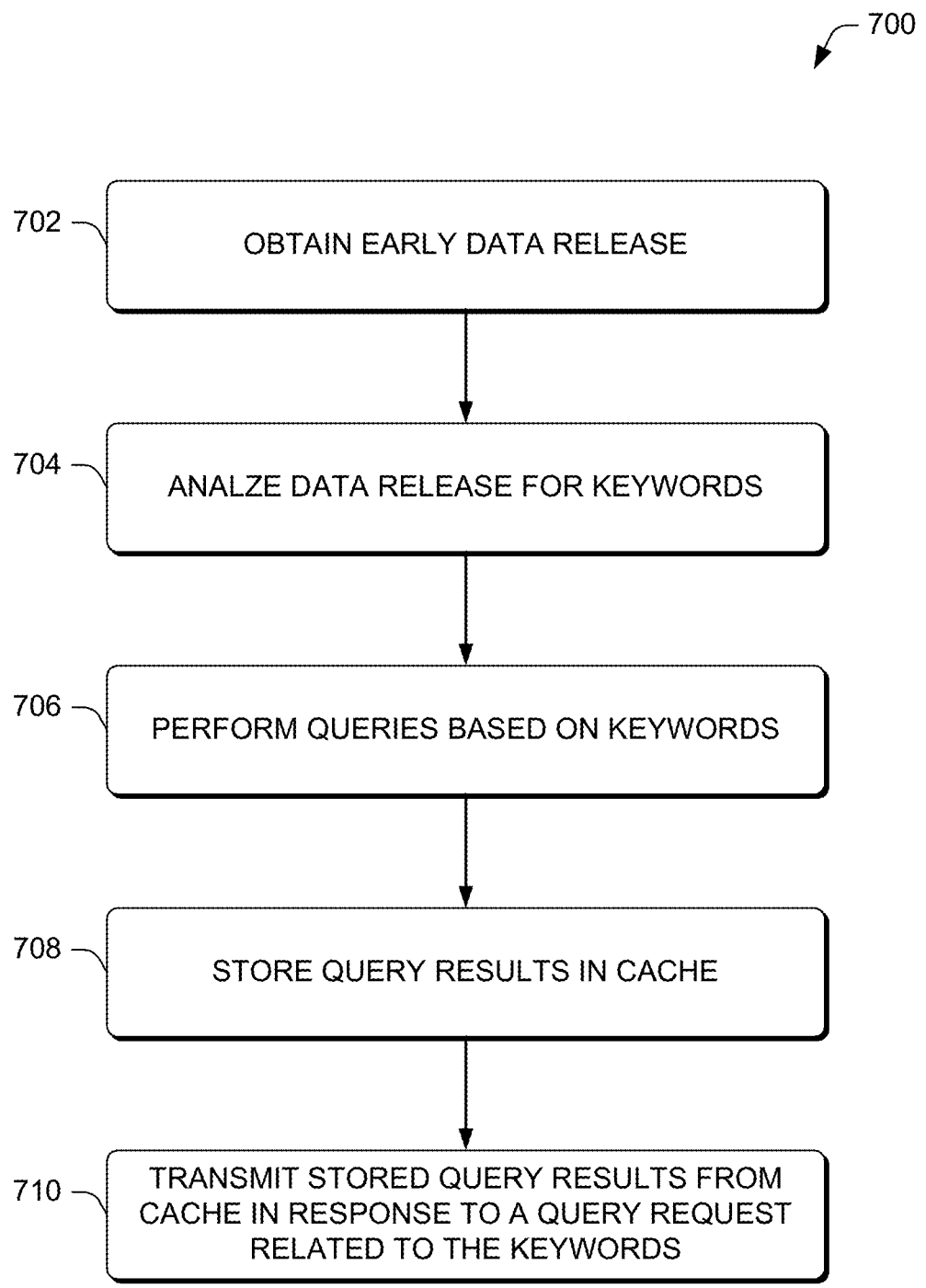
FIG. 7 is a flow diagram of an illustrative process to pre-calculate queries performed by a data center.

FIG. 7 is a flow diagram of an illustrative process 700 to pre-calculate queries performed by the servers 104 at the data center 102 of FIG. 1. Again, the order in which the operations are described is not intended to be construed as a limitation, and any number of the described blocks can be combined in any order and/or in parallel to implement the process. The remaining processes described in this disclosure, in addition to process 700, shall be interpreted accordingly.

At 702, the decomposer module 128 may obtain an early data release prior to a high-volume period of workload of the data center 102. The early data release may include news headlines after an initial publishing (posting, etc.), or other news that is received in advance of publication or shortly after publication before it has been widely consumed by users.

At 704, the decomposer module 128 may analyze the data release for keywords. The keywords may be selected based on the title of an article, the number of uses of the words, the popularity of the word, or other factors. In some instances, the keywords may be a person's name or another term of interest. In some embodiments, the blueprint of the operation 404 of FIG. 4 may indicate how to select and/or process the keywords.

At 706, the decomposer module 128 may perform queries using the keywords. The queries may be structured based on similar historical queries via the blueprint. For example, when the keywords include a celebrity's name, historical queries that were computed based on celebrity names may be used to structure the query and/or define parameters of the query as the blueprint.

At 708, the decomposer module 128 may store the results of the queries from the operation 706 (i.e., the manipulated data 132) in the cache 130.

At 710, during a high-volume period, the decomposer module 128 may transmit the manipulated data 132 from the cache 130 to the users that submit a search request for related keywords. In some instances, the search queries may not be an exact match of the keyword-based queries that were pre-computed in the operation 706. However, the manipulated data 132 may be substantially similar such that transmitting the manipulated data 132 to the user will satisfy the user's request while allowing the servers 104 at the data center 102 to perform minimal computations (work) during a high-volume period.

Figure 8:
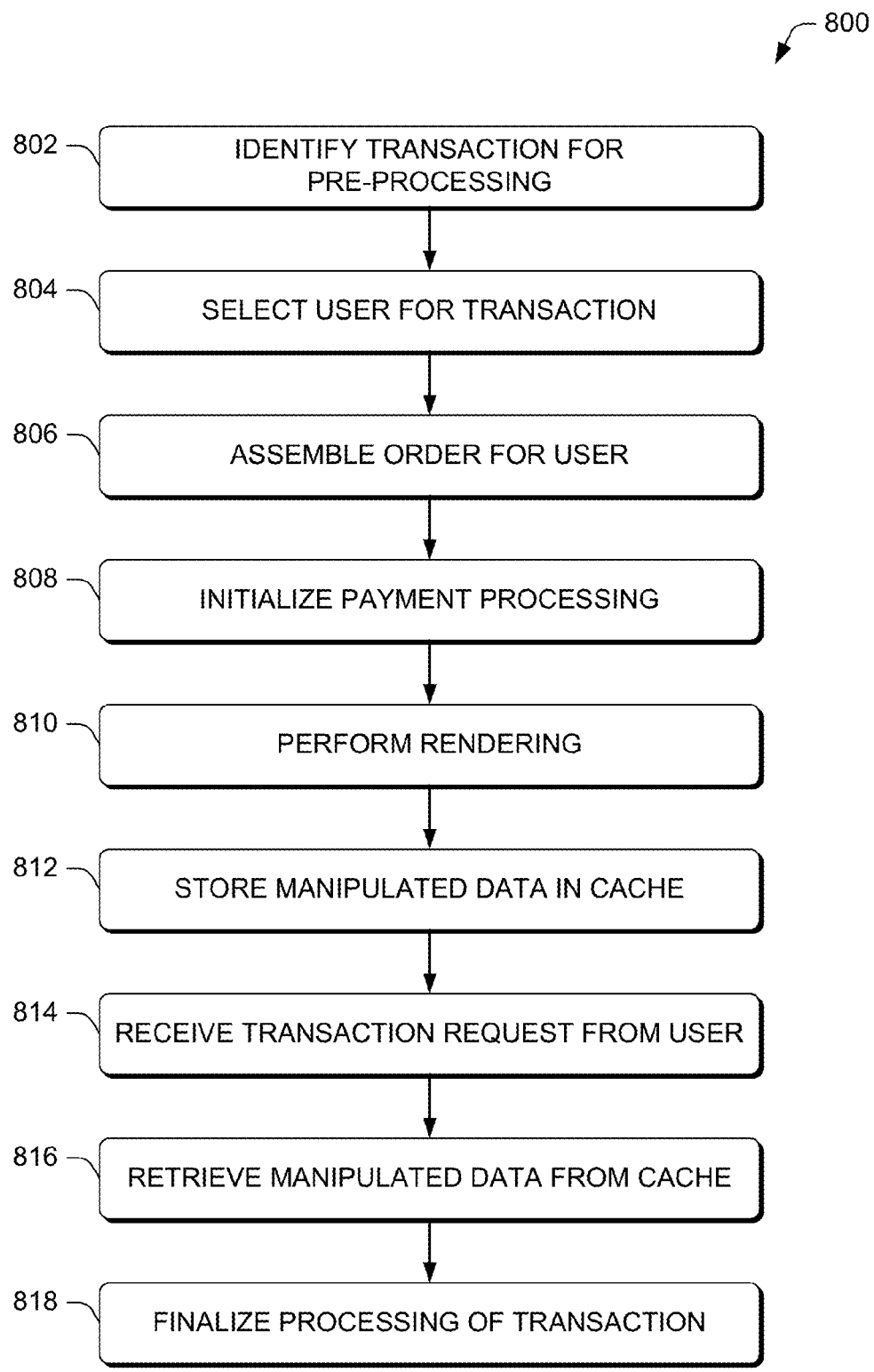
FIG. 8 is a flow diagram of an illustrative process to pre-compute transactions performed by a data center.

FIG. 8 is a flow diagram of an illustrative process 800 to pre-compute transactions performed by the servers 104 at the data center 102.

At 802, the decomposer module 128 may identify a transaction for pre-processing. For example, the transaction may be for a sale of goods or services from an e-commerce retailer.

At 804, the decomposer module 128 may select a user that is speculatively associated with the transaction. The user may be selected based on various criteria, such as frequency of purchase, likelihood of purchase, and so forth, such that the user is likely to complete the transaction during a high-volume period of operation of the servers 104 at the data center 102. For example, the transaction may be a release of a new highly anticipated book or movie for which many transactions involving the item are expected to occur following the release.

At 806, the decomposing module 128 may assemble the transaction for the user by adding anticipated items (e.g., the book, movie, etc.) to an order.

At 808, additional processing may include initializing payment processing, which may include pre-approving funds for the transaction.

At 810, the decomposing module 128 may perform rendering of some pages, such as a receipt page, or other pages that may be presented to the user when the user requests the transaction. In some embodiments, more or fewer transactional tasks than those described in the operations 806-810 may be performed by the servers 104 to pre-compute workload of the data center 102.

At 812, the manipulated data 132, which may include data generated by the operations 804-810, may be stored in cache.

At 814, the servers 104 at the data center 102 may later receive a transaction request from the user, possibly during a high-volume period of workload performed by the servers 104 at the data center 102.

At 816, the servers 104 at the data center 102 may retrieve the manipulated data 132 from the cache 130.

At 818, the processing of the order may be finalized.

As an example of the process 800, the transaction may be for a new release of a book that has generated a large demand. The decomposer module 128 may select the users at the operation 804 as users that typically purchase new release titles or related books, such as by querying historical data during a low-volume period (i.e., creating the blueprint). The payment processing may be performed at the operation 808 for users that have their payment information stored in a user account. If the user does not request the transaction at 814, the manipulated data 132 may be purged from the cache at a later time, such as after the high-volume period or when the manipulated data becomes stale.

Figure 9:
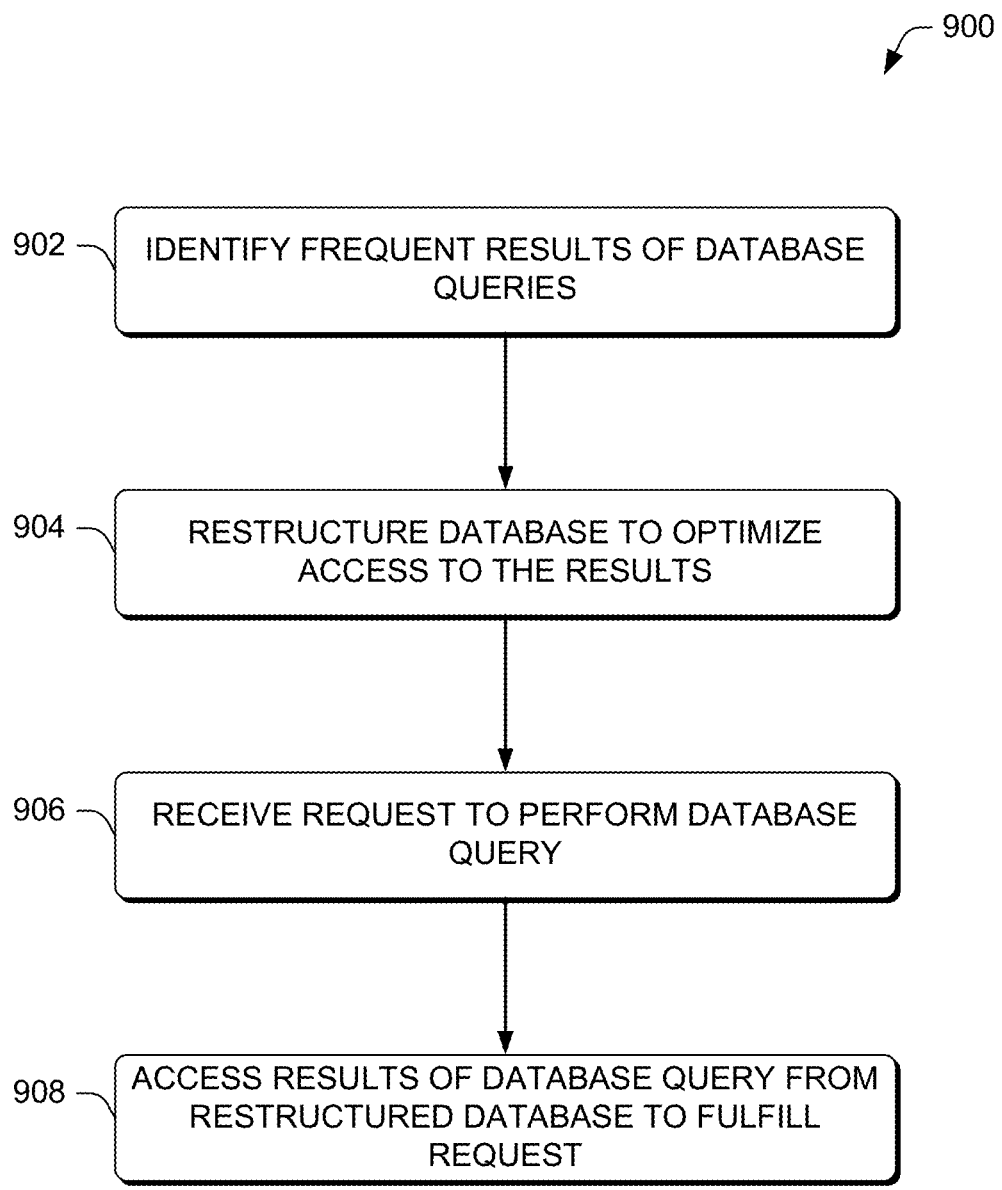
FIG. 9 is a flow diagram of an illustrative process to optimize databases accessed by a data center to reduce computation time.

FIG. 9 is a flow diagram of an illustrative process 900 to optimize databases accessed by the data center 102 to reduce computation time.

At 902, the decomposer module 128 may identify frequent results of database queries that are often executed by the servers 104.

At 904, the servers 104 may restructure the database to optimize access to the results of the queries. The restructuring may be performed during a low-volume period prior to a high-volume period when the servers 104 at the data center 102 are experiencing a large workload.

At 906, the servers 104 at the data center 102 may receive a request to perform the database query that has results that have been optimized at the operation 904.

At 908, the servers 104 at the database 102 may access the results of the database query from the restructured database during the high-volume period, and thus fulfill the request using fewer computing resources than necessary had the database not been restructured for the optimization during the low-volume period of workload of the data center 102.

The process 900 may exploit load balancing opportunities by pre-configuration and/or preprocessing of a database to enable the database to provide more efficient access (faster response time, less resource consumption, etc.) in response to real time or near-real time requests. For example, generation of materialized views may be performed during the process 900, which may make database access more efficient given a probability distribution over anticipated forthcoming queries.

CONCLUSION

The above-described techniques pertain to forecasted pre-computation for load balancing of data centers. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method implemented by one or more processors of load-balancing a data center workload of a data center, the method comprising:
predicting a high-volume period having a forecasted workload that exceeds a target workload level;
ascertaining a low-volume period prior to the high-volume period based at least in part on an inverse curve of a cumulative curve, the cumulative curve being an overlay of data center operational factors that indicate a price per operation unit for operating the data center;
selecting computing tasks that are anticipated to occur during the forecasted workload for pre-computation;
performing the pre-computation of the computing tasks associated with the forecasted workload during the low-volume period to generate manipulated data; storing the manipulated data in cache; and
retrieving the manipulated data upon a request that uses the manipulated data during the high-volume period to expedite processing of the request.

2. The method as recited in claim 1, wherein the data center operational factors indicate efficient periods to schedule workloads for pre-computation that are preferentially selected over non-efficient periods.

3. The method as recited in claim 1, wherein the data center operational factors further include a cost of power from a power grid that is shared by the data center and another power consumer and another cost of power from a dedicated power supplier that exclusively supplies power to the data center.

4. The method as recited in claim 1, wherein the pre-computation includes at least one of:
pre-computing anticipated queries;
pre-computing anticipated transactions; and
optimizing databases to enable expedited results of database queries.

5. The method as recited in claim 1, wherein the selecting computing tasks is based on a historical analysis of tasks that are anticipated to reoccur on one or more future dates.

6. The method as recited in claim 1, wherein the selecting occurs at near-real time as the data center workload enters the high-volume period.

7. A data center processing system, comprising:
a communication adapter configured to enable a data center to receive a request from an entity computing device and transmit a response to the entity computing device;
one or more processors; and
memory storing computer readable instructions executable by the one or more processors, wherein the computer readable instructions provide a decomposer module configured to:
identify computing tasks to be pre-computed in anticipation of the request expected to occur during a high-volume period of workload of the data center, the computing tasks to fulfill at least a portion of the request;
ascertain a low-volume period based at least in part on an inverse curve of a cumulative curve, the cumulative curve being an overlay of data center operational factors that indicate a price per operation unit for operating the data center;
pre-compute the computing tasks during the low-volume period to create manipulated data based on a computing blueprint that uses historical computing trends to determine how to pre-compute the computing tasks;

store the manipulated data in cache for access during the high-volume period; and retrieve a portion of the manipulated data to expedite satisfying the request upon receipt of the request.

8. The system as recited in claim 7, wherein the decomposer module is further configured to delete unused instances of the manipulated data when the manipulated data becomes stale.

9. The system as recited in claim 7, wherein the computing tasks include queries that are pre-computed by selecting keywords from an early data release.

10. The system as recited in claim 7, wherein the computing tasks include transactions that are pre-computed by inputting at least one of user information, item information, and payment information.

11. The system as recited in claim 7, wherein the computing tasks include an optimization of databases to enable expedited results of database queries.

12. The system as recited in claim 7, wherein the instructions further provide a scheduler module configured to:
predict workload volume of the data center; and
schedule the pre-compute to occur during the low-volume period.

13. The system as recited in claim 12, wherein the scheduler module is further configured to provide the overlay of the data center operational factors that affect workload scheduling.

14. A method implemented by one or more processors of processing a portion of a computing workload of a data center prior to a request of the computing workload, the method comprising:
identifying computing tasks performed by the data center to be pre-computed prior to an initiated request;
obtaining inputs for pre-computing based on a historically based blueprint that uses historical trends to predict future computing demands;
ascertaining a low-volume workload period of the data center based at least in part on an inverse curve of a cumulative curve, the cumulative curve being an overlay of data center operational factors that indicate a price per operation unit for operating the data center, the inverse curve having at least one high curve portion that is equivalent to a mean workload of the data center;
performing the pre-computing of computing tasks during the low-volume workload period of the data center prior to a high-volume workload period, the pre-computing tasks to create manipulated data;
storing the manipulated data in cache; and
retrieving the manipulated data in response to a received request that corresponds to the computing tasks.

15. The method as recited in claim 14, wherein the inputs include keywords selected from an early data release that are search terms for queries.

16. The method as recited in claim 14, wherein the inputs include transaction information to enable pre-computing of a transaction by performing at least one of compiling a portion of a transaction, adding items to an order, processing a payment, or assigning a customer.

17. The method as recited in claim 14, further comprising generating a forecasted schedule of the computing workload of the data center that includes the low-volume workload period and the high-volume workload period.

18. The method as recited in claim 17, wherein the operational factors include at least one of a cooling cost for one or more servers in the data center, a cost of power from a power grid that is shared by the data center and another power consumer, or another cost of power from a dedicated power supplier that exclusively supplies power to the data center.

19. The method as recited in claim 14, wherein the identifying includes identifying the computing tasks performed by the data center based on statistical models using at least one of a user history, machine usage, or data center performance.

* * * * *